United States Patent [15] 3,677,412
Connor [45] July 18, 1972

[54] OIL FILTER AND SEAL MEANS THEREFOR
[72] Inventor: Augustus S. Connor, Gastonia, N.C.
[73] Assignee: Wix Corporation, Gastonia, N.C.
[22] Filed: Nov. 13, 1970
[21] Appl. No.: 89,199

[52] U.S. Cl. ...................................210/440, 210/DIG. 17
[51] Int. Cl. ..........................................................B01d 27/00
[58] Field of Search..........................210/DIG. 17, 130, 440

[56] References Cited

UNITED STATES PATENTS 3,272,342  9/1966  McLaren et al. .......................210/440

Primary Examiner—Reuben Friedman
Assistant Examiner—R. W. Burks
Attorney—Shoemaker & Mattare

[57] ABSTRACT

An oil filter of the screw-in throw-away type having unique seal means on an end wall thereof which is urged into tight sealing engagement by both the oil pressure within the filter and the engagement between the seal means and an associated structure against which the seal means seals when the filter is in use.

3 Claims, 4 Drawing Figures

Patented July 18, 1972
3,677,412
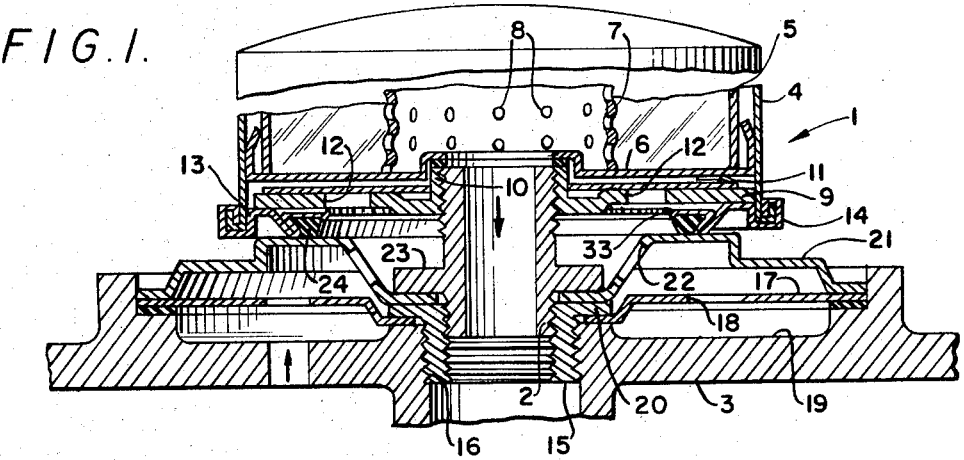
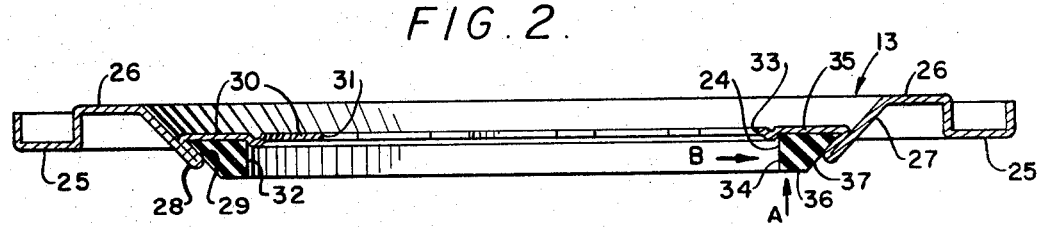
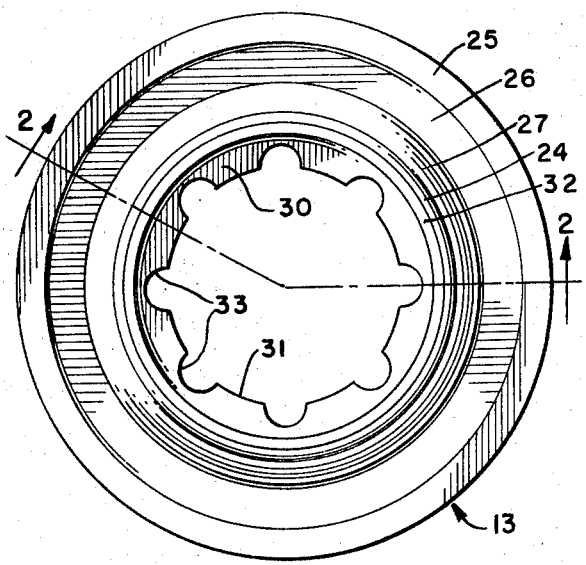
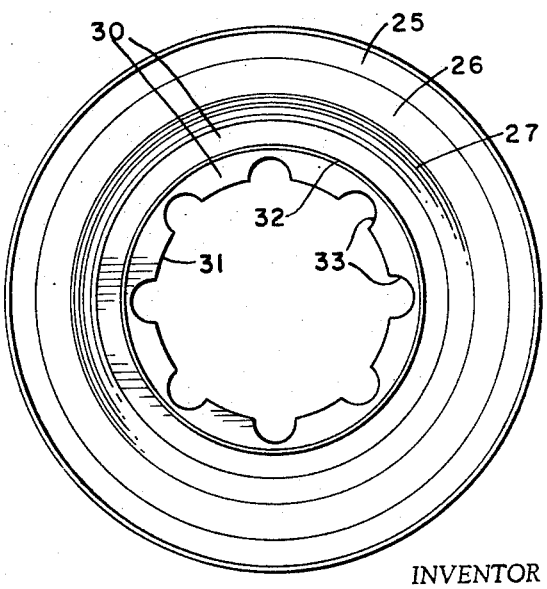
INVENTOR
AUGUSTUS S. CONNOR
BY *Shoemaker and Mattare*
ATTORNEYS

OIL FILTER AND SEAL MEANS THEREFOR

BACKGROUND OF THE INVENTION

This invention relates to oil filters and particularly to the screw-in throw-away type in which a filter cartridge is permanently secured within a filter shell.

In the throw-away type of oil filter, it is important to keep the cost of the filter low; and in order to do this, it is essential that inexpensive materials be used such as thin sheet metal; and it is important to so construct the filter that it will withstand a high internal pressure.

In prior art filter constructions, various arrangements are provided for effecting a strong and inexpensive filter shell and various seal means are utilized for effecting a seal between the end wall of the filter shell and an engine block or adapter plate or the like on which the filter is used. Such seal means frequently do not provide an effective seal when the oil pressure is high and are subject to being blown out under severely high oil pressures or are constructed in a relatively complicated and expensive manner in order to provide a sufficiently strong seal to withstand high oil pressures and provide an effective seal.

OBJECTS OF THE INVENTION

It is an object of this invention to provide a full-flow screw-in throw-away type of oil filter of simple and economical construction having the open end thereof sealed to withstand high internal oil pressure.

Another object of this invention is to provide an oil filter having an unique and novel seal at the open end thereof which provides an effective seal under high internal oil pressure and wherein a sealing ring is disposed in an undercut recess in such a manner that the axial pressure against the seal ring caused by screwing the filter into place and the internal pressure exerted on the seal ring from the oil causes the seal ring to seat more securely and effect a stronger seal.

BRIEF DESCRIPTION OF THE DRAWINGS

FIG. 1 is a part sectional view in elevation of a portion of an oil filter screwed in place on an engine block and illustrating the unique and novel seal means of the present invention.

FIG. 2 is a sectional view in elevation of the filter shell end wall and seal means of the present invention taken along line 2—2 in FIG. 3.

FIG. 3 is a bottom plan view of the filter shell end wall and seal means of FIG. 2.

FIG. 4 is a top plan view of the filter shell end wall and seal means of FIG. 2.

DETAILED DESCRIPTION OF THE INVENTION

Referring now to the drawings, wherein like reference numerals refer to like parts throughout the several views, a full-flow screw-in throw-away type oil filter 1 is screwed in position on a coupling nipple 2 on a portion of an engine block 3. The filter comprises an outer, thin metallic shell 4 having an open end and closed end. A suitable filter cartridge means 5 formed of a pervious sheet material such as paper or the like, is permanently secured within the shell 4. The opposite ends of the filter cartridge are closed by closure plates, only one of which, 6, is shown. The closure plate 6 is suitably bonded to the filter cartridge as by any suitable adhesive or bonding agent. A perforated center tube 7 extends co-axially within the filter and has a plurality of openings 8 therein through which the oil passes from the filter cartridge to the center of the filter for return to the engine block. A suitable reinforcing plate 9 of relatively heavier metallic or the like material than the shell 4 is secured within the open end of the filter shell 4 and has a centrally located axially upturned internally threaded sleeve portion 10 by means of which the filter is secured to the coupling nipple 2. A valve plate 11 is disposed between the closure plate 6 and reinforcing plate 9 for controlling flow through apertures 12 in the reinforcing plate. The open end of the filter shell 4 is closed by a filter shell end wall 13 which is suitably secured and sealed to the lower marginal edge of the filter shell such as by means of the roll seal 14.

The coupling nipple 2 is threaded into a flanged nipple 15 which is in turn threaded into the bore of oil return passage 16 in the block 3. A baffle plate 17, having a plurality of openings 18 therein, is clamped in position over an annular channel 19 by means of an annular flange 20 on the flanged nipple 15. An adapter plate 21 having a plurality of openings 22 therein formed with offset portions to space the openings 22 from the baffle plate 17 to provide for flow between the baffle plate and adapter plate is disposed in overlying relationship to the baffle plate 17 and clamped in position at its inner marginal edge by a flange 23 on the coupling nipple 2. The construction aforedescribed is substantially conventional and is described in order that the invention may be better understood.

As seen best in FIGS. 1 and 2, a gasket seal means 24 formed of rubber or the like is carried by the filter shell end wall 13 for sealing against the adapter plate 21 when the filter is screwed into position.

As best seen in FIG. 2, the filter shell end wall 13 includes an upwardly open channel portion 25 at its peripheral marginal edge portion, the outer edge or wall of which is turned upwardly and inwardly over the lower edge portion of the filter shell 4 to define the rolled seam 14. Immediately adjacent and radially inwardly of the channel portion 25 is a flat, planar portion 26 which extends upwardly within the open bottom marginal edge portion of filter shell 4 and into supporting engagement with the peripheral marginal edge of reinforcing plate 9. An annular, downwardly sloping conically shaped portion 27 is joined to the portion 26 and includes a portion 28 at the lower edge thereof folded back upon itself to define an upwardly facing, radially inwardly directed conically shaped annular surface 29. A second annular planar surface 30 is joined to the upper end of the conical surface 29 and extends radially inwardly toward the center of the end wall 13. A relatively large opening 31 is formed in the center of the end wall and a shallow, annular, downwardly directed rib 32 is formed intermediate the inner and outer diameters of annular portion 30. A plurality of semi-circular cut-outs 33 are formed in the inner marginal edge portion of surface 30 to provide oil passages through the filter shell end wall to the interior of the filter shell. Inclined wall 29, planar portion 30, and rib 32 define a recess or pocket for the sealing gasket 24. The sealing ring 24 is trapezoidal in cross-section and includes a generally vertical inner annular wall or side 34; generally horizontally extending upper and lower parallel walls or sides 35 and 36, respectively; and an inclined, conically shaped outer wall or side 37. Side 35 of the seal 24 is substantially wider than side 36 and extends from the annular rib 32 to the juncture of planar portion 30 with the inclined portion 29. The sloping side 37 is inclined with the same angle as the sloping surface 29; and when the seal 24 is fitted in position as in FIGS. 1 and 2, the rib 32 and inclined surface 29 securely hold the seal in position on the filter shell end wall 13. When the filter is screwed in position, the side 36 of the sealing gasket 24 is disposed in a plane spaced downwardly from the plane of the filter end wall and engages the adapter plate 21. The sealing gasket is urged upwardly against the bottom side of planar surface 30 with a force in the direction indicated by arrow A; and oil pressure within the filter exerts a force on the sealing gasket in the direction indicated by arrow B on side 34, urging the sealing gasket tighter into the undercut recess defined by sloping surface 29 and planar surface 30 thereby effecting a tighter and more secure seal between the gasket, end wall and adapter plate at higher oil pressures.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. A screw-in throw-away oil filter having a casing, the casing having an open end and a closed end, an end wall closing the open end, a filter media in the casing, the filter being adapted to be attached by screw threads to a mounting plate on an engine block, the end wall having screw threads thereon for the attachment, inflow and outflow openings in the end wall, the filter media being between the inflow and outflow openings, the end wall having an outer peripheral portion attached to the open end of the casing closing the open end, an inwardly extending short planar portion inwardly of the peripheral portion, a frusto-conical portion inwardly of the planar portion and extending inwardly and downwardly from the planar portion, the frusto-conical portion having an inner edge, the inner edge being folded back upon the frusto-conical portion a part of the depth of the frusto-conical portion, a second planar portion extending inwardly from the folded back portion, the second planar portion extending toward and ending at an inner periphery of the end plate, a downwardly extending rib intermediate the ends of the second planar portion, the folded back part of the inner edge of the frusto-conical portion, the second planar portion to the rib and the rib forming a pocket intermediate the inner and outer peripheries of the end wall, the folded back part forming an upwardly and outwardly extending wall, the second planar portion forming a straight inner wall and the rib denoting the inner extent of the pocket, a seal ring in the pocket, the seal ring being of a shape to fit into the pocket and comprising upper and lower planar surfaces parallel to each other, an inner planar surface, the joint between the upper planar surface and the inner planar surface engaging the rib in the second planar portion of the end wall, an outer surface being complementary to the frusto-conical portion of the end wall with the joint between the outer surface and the upper surface engaging the joint between the folded back portion and the second planar portion of the end wall, whereby when the filter is applied to the mounting plate the seal ring is forced into tight sealing engagement by the compression applied to the lower planar surface of the ring forcing the upper and complementary surfaces into engagement with the respective portions of the wall and the ring is forced into further tight sealing engagement by the pressure of the oil upon the inner planar surface causing the complementary surface into further engagement with the folded back portion of the end wall.

2. An oil filter as in claim 1, wherein: said gasket means is trapezoidal in cross-section and includes an inclined side in mating engagement with said upwardly facing inclined surface and a planar side joined to said inclined side in mating engagement with said planar portion of said end wall.

3. An oil filter as in claim 1, wherein: said gasket projects downwardly below the plane of said end wall.

* * * * *